United States Patent [19]
Adams

[11] 4,238,113
[45] Dec. 9, 1980

[54] JACKING DEVICE

[76] Inventor: Vernon E. Adams, 665 W. Baker, Clawson, Mich. 48017

[21] Appl. No.: 95,507

[22] Filed: Nov. 16, 1979

[51] Int. Cl.³ .............................................. B60S 9/02
[52] U.S. Cl. .................................. 254/86 R; 254/134
[58] Field of Search .................. 254/86 R, 45, 134

[56] References Cited

U.S. PATENT DOCUMENTS

| | | | |
|---|---|---|---|
| 2,549,862 | 4/1951 | Thorndike | 254/134 |
| 2,852,229 | 9/1958 | Gross | 254/134 |
| 3,595,527 | 7/1971 | Douglass | 254/86 R |
| 3,851,855 | 12/1974 | Douglass | 254/86 R |
| 4,068,826 | 1/1978 | Scott | 254/134 |
| 4,176,824 | 12/1979 | Linton et al. | 254/86 R |

*Primary Examiner*—Robert C. Watson
*Attorney, Agent, or Firm*—Harness, Dickey & Pierce

[57] ABSTRACT

This disclosure relates to a jacking or lifting device for use with trailers or the like. The jacking device of the present invention is basically a two-piece structure comprised of a rough adjusting column which is spaced apart from and externally secured to the outside cylinder or housing of an otherwise conventional lifting jack. With this new construction, only relatively simple adjustments need to be made on the rough adjusting column, to enable the jacking device of the present invention to cover a wide range of lifting heights with minimum effort.

6 Claims, 5 Drawing Figures

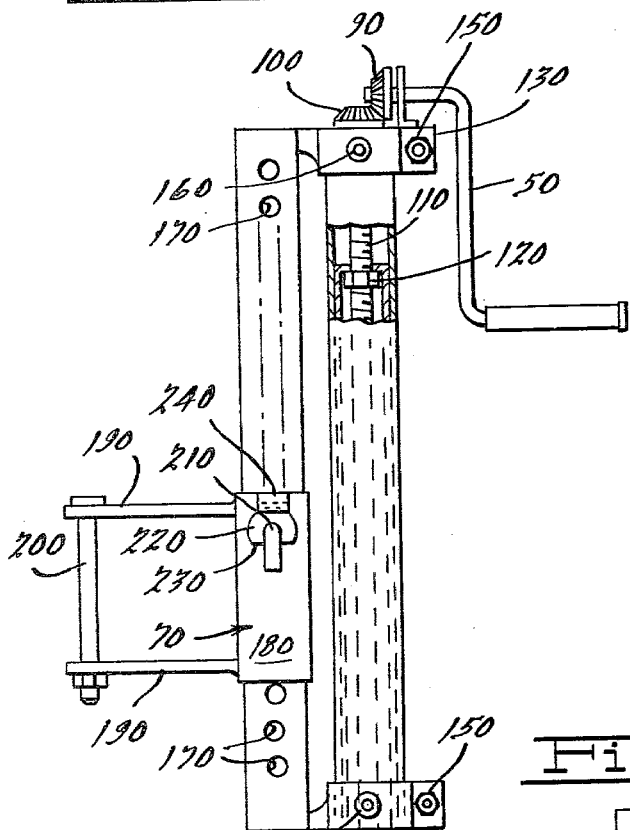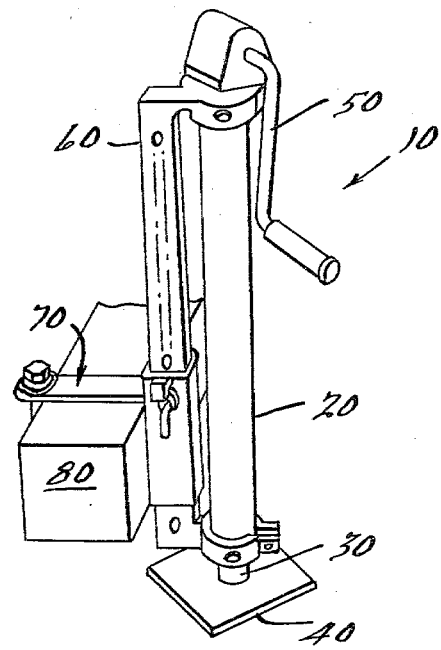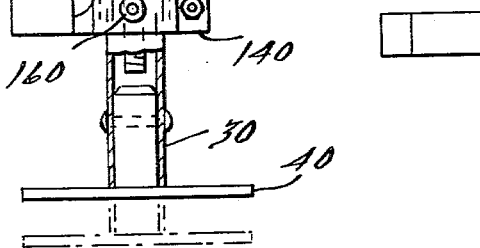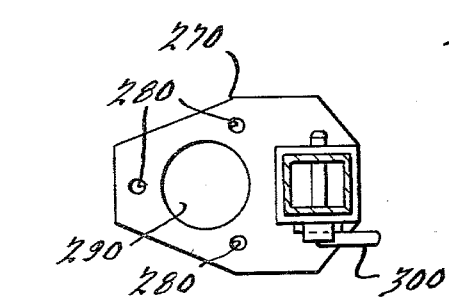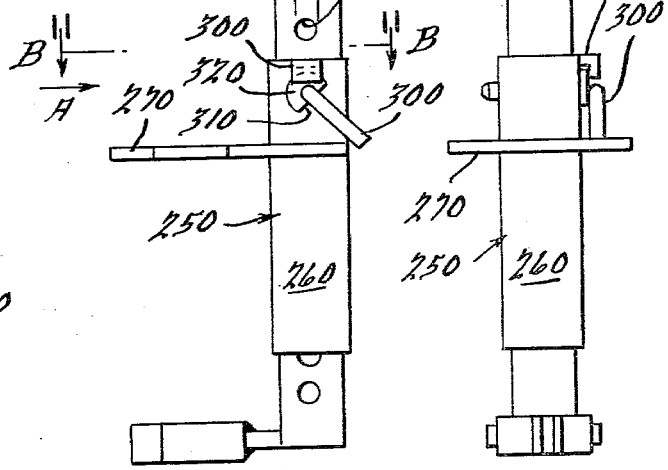

JACKING DEVICE

BACKGROUND AND SUMMARY OF THE INVENTION

The present invention pertains primarily to mechanical lifting devices, and more particularly to jacking devices for use with trailers or the like.

Generally, lifting jacks are made in many different types and sizes, ranging from small jacking devices used for leveling and supporting work on wood planers to powerful hydraulic jacks capable of lifting a locomotive or even greater weights. The mechanisms used in the different types of jacks also vary greatly, with one of the more popular types consisting of a lifting screw which is inserted in a suitable base. Other types include the gear-and-rack and the lever-and-rack types, in addition to the many different designs that are hydraulically operated. While the lifting capacity varies greatly, in general, screw-type jacks and those belonging to the reduction gear-and-rack class are capable of lifting loads of several tons, whereas those operated by hydraulic power ordinarily are capable of lifting much more than that. The present invention relates primarily to screw, lever, or gear-type jacks, although it is contemplated that the basic idea of the invention might also be applied to other types of jacking devices.

Except for scissors or tripod-type jacks, most conventional jacking devices for use with trailers, automobiles, trucks, campers, and the like comprise a vertical member having a base for supporting the jack and an engaging member somehow mounted on the vertical member which may be either attached to, or positioned under the object to be lifted. The engaging member is moved upwardly along the vertical member by way of whatever jacking mechanism is selected, thereby lifting the object. For example, in order to lift an automobile to remove a wheel, the engaging member might be positioned under the car's bumper, and then moved up the vertical member by means of a lever-and-rack mechanism. In order to level a small trailer, the engaging member might be either positioned under the trailer frame or under the front tow bar or tongue, and then moved up the vertical member by means of a continuous screw mechanism.

Typical of one of the jacking devices currently used with many travel-type trailers is a jack having a generally square bottom and an upper pyramid-like structure. The upper "pointed" portion of the pyramid frame is threaded so as to accept a threaded support pipe which is then rotated via a rod handle passing through it. In this way the support pipe is slowly moved upwardly into engagement with a trailer frame in order to level or stabilize it by raising it to an appropriate height. In addition to being clumsy and difficult to use, this type of device is not self-storing and must be physically removed from the underside of the trailer and somehow stored every time the trailer is moved. Of course, the trailer owner would have to repeatedly crawl under the trailer to position this type of jack and likewise have to repeatedly crawl in and out to check on his leveling efforts. Although two such leveling jacks are normally supplied with most travel trailers, usually four are necessary to adequately level and support a parked trailer. Storing such jacks in trailer storage compartments takes up valuable space which might better be used to store other necessities.

An additional feature present on some jacking devices is both a rough and fine adjustment of the engaging member. The use of both a rough and fine adjustment does away with the need for having to raise the jack by way of a single, slow operating, and continuous jacking mechanism. The rough adjustment allows selection of intermediate levels closer to the final desired height. Normally, such a feature is somehow built into the vertical member or engaging member so that a rough height adjustment may first be made to align the engaging member with the object to be lifted. The regular jacking mechanism which provides a finer, continuous height adjustment is then used to actually lift the object. Most such devices, however, require that the rough adjustment be an integral part of the vertical member and thus the cost and clumsiness of the device is substantially increased. Also, most such devices do not allow attachment to the object being lifted prior to making the rough adjustment, which often significantly hampers operation of the jacking device and also complicates storage.

Accordingly, it is a principle object of the present invention to provide an improved jacking device for use with trailers or the like which allows both rough and fine adjustments, integral storage capability, and easy adaptability to various mounting configurations.

In general, the jacking device of the present invention comprises an upright vertical housing and includes means for moving a support base and inner telescoping member in said vertical housing from a retracted position to an extended position, so that the overall length of the jacking device is increased. A rough adjusting column is provided which is spaced apart from and secured to the exterior of the upright vertical housing. This rough adjusting column includes an engaging member movably mounted thereon for contacting the object to be lifted and also includes means for locating and securing the engaging member at various positions along the column so that a rough height adjustment may be made prior to using the regular jacking mechanism to make the final height adjustments. A plurality of longitudinally spaced holes extending transversely through the rough adjusting column may be provided and a complimentary pair of holes extending transversely through the portion of the engaging member which is slidably mounted on the column may also be provided, with all the holes being transversely aligned so that a locating pin may be inserted through the holes to secure the engaging member at a desired height. This would set the rough adjusting feature of the present invention with the fine adjustment being carried out by the use of a conventional jacking mechanism contained in the upright vertical housing of the jacking device. The present invention is especially suitable for use with travel-type trailers and such use will be described herein. However, it is to be understood that the present invention is equally applicable to other jacking arrangements.

Additional advantages and features of the present invention will become apparent from a reading of the detailed description of the preferred embodiment which makes reference to the following set of drawings in which:

BRIEF DESCRIPTION OF THE DRAWINGS

FIG. 1 is a perspective view of a jacking device made in accordance with the present invention, shown as attached to the rear bumper of a trailer;

FIG. 2 is a side view of the jacking device of FIG. 1, partially in side elevation and partially in longitudinal section;

FIG. 3 is a side view of another embodiment of the rough adjusting column used in accordance with the present invention;

FIG. 4 is a front view of the rough adjusting column of FIG. 3 along the arrow A; and FIG. 5 is a view of the rough adjusting column of FIG. 3 along the line B—B.

DETAILED DESCRIPTION OF THE PREFERRED EMBODIMENT

Referring now to FIG. 1, a jacking device made in accordance with the present invention is shown. The jacking device 10 illustrated in this preferred embodiment is constructed for mounting on the rear bumper of a travel-type trailer. However, it is to be understood that the present invention is applicable to other mounting configurations. The jacking device 10 generally comprises an upright vertical housing 20 which contains an inner telescoping member 30 on its lower end and a support base 40. A crank arm 50 is provided on the top of the upright vertical housing, which when rotated causes the jacking mechanism contained within the housing 20 to operate. It is to be understood that the portion of the present invention described up to this point comprises a conventional lifting jack which is believed to be readily available and currently in use on some travel trailers. This conventional lifting jack in general functions by going from a retracted position in which the inner telescoping member 30 and support base 40 are contained mostly within the housing 20, to an extended position in which the support base 40 is spaced apart from the housing 20 and contacts the ground or support surface, and the upright vertical housing 20 is telescopically moved relative to the inner member 30 by means of the jacking mechanism within the housing 20.

The jacking device shown in this figure also comprises a rough adjusting column 60 which is spaced apart from and secured to the exterior of the upright vertical housing 20. An engaging member 70 is slidably mounted on the rough adjusting column and in this embodiment is shown engaged with a trailer bumper 80.

Referring now to FIG. 2, the inner structure of part of the jacking device and in particular the upright vertical housing 20, inner telescoping member 30 and crank arm 50 is shown. Relative telescopic movement between the housing 20 and the inner member 30 with attached support base 40 is caused by rotating crank arm 50 thereby causing gear 90 to drive gear 100. The rotational movement of gear 100 is transferred to threaded rod 110 which is in turn attached to the top portion of the inner telescoping member 30 by nut 120. A typical conventional lifting jack of the screw type would require about eight 360° turns of crank arm 50 in order to produce one inch of relative lifting movement. Since such continuous turning is rather tedious, therein lies the need for a lifting method with rough height adjustment. The rough adjusting column 60 is attached to the upright vertical housing 20 via upper and lower clamps 130 and 140 respectively. A nut and bolt fastening member 150 is passed through each of the joined ends of these clamps to secure the rough adjusting column to the upright vertical housing 20. In addition to the fasteners 150, point-type set screws 160 are provided on both sides of the upper and lower clamping members 130 and 140, to prevent rotational or axial movement of the rough adjusting column 60 once it is positioned. In this way, relative movement between the column 60 and the housing 20 is prevented by the four set screws as well as the clamps themselves. In the alternative, by loosening the set screws and clamps, the rough adjusting column 60 or housing 20 may be rotated into more convenient operating or storage positions. This is particularly useful when additional space is necessary to rotate the crank arm 50.

The rough adjusting column 60 is of generally square cross section and is tubular. A plurality of longitudinally spaced holes 170 extending transversely through the column are provided over most of the length of rough adjusting column 60. Spacing these holes 170 about one inch apart has proven satisfactory to enable sufficient selection of rough adjustment positions. In addition, drain holes (not shown) may be provided in the column if top and bottom surfaces are welded onto the tubular column to connect it to the clamping members 130 and 140. The engaging member 70 comprises a square tubular portion 180 slidable over the rough adjusting column 60 and two arm-like projections 190 which are welded to said tubular portion 180 at right angles thereto. The two arm-like projections 190 are connected at their outermost ends via a nut and bolt fastener 200. FIG. 1 shows the engaging member 70 engaged to a trailer bumper 80 with the fastener 200 being secured after the projections 190 are slipped over and under the bumper.

It should also be noted that a locating pin 210 is shown on the tubular portion 180 of the engaging member 170. This pin 210 extends transversely through a pair of holes 170 in the rough adjusting column 60. Locating pin 210 contains a collar or disk 220 adjacent one of its ends which has a flat portion 230. As will be more fully explained later, disk 220 is used for locking the pin 210 under a tab 240 on the side of the tubular portion 180 of the engaging member 170. The pin 210 is bent 90° on one of its ends to allow for easier insertion, rotation, and removal.

In operation, when a trailer is being towed down a road, the trailer jack shown in FIG. 1 would be positioned so that the support base 40 is as far from the ground as possible with inner telescoping member 30 completely contained within upright vertical housing 20 and with tubular portion 180 positioned at or near the lower end of column 60. When the trailer has been positioned in its desired parking location, the locating pin 210 would be rotated until the flat portion 230 on its inner disk 220 clears the tab 240 on the tubular portion 180. At this point the locating pin would be withdrawn totally from both the tubular portion 180 and the rough adjusting column 60. This would enable both the rough adjusting column 60 and the entire jacking device to move downward free of the engaging member 70 which has already been secured to a trailer bumper. The support base 40 would then be brought as close to the ground as possible and a pair of holes in both the tubular portion 180 and the rough adjusting column 60 would be transversely aligned so that the locating pin 210 could be inserted therethrough to roughly locate the final jacking position. Once the locating pin has been inserted through the above mentioned holes it would be rotated 180° so that disk 220 lies behind tab 240 and the flat portion 230 of the disk 220 faces away from the tab 240. This eliminates any chance of the pin slipping out by itself and also prevents accidental removal of the pin.

Since the longitudinally spaced holes 170 in the rough adjusting column 60 are spaced about one inch apart, the crank arm 50 should only have to be turned about an inch or less to bring the support base 40 into contact with the ground. Any further rotation of the crank arm 50 will cause the engaging member 70 to lift the trailer bumper 80 in an upward vertical direction away from the ground. In a conventional screw-type lifting jack, such as that manufactured by Atwood Mobile Products of Rockford, Illinois, it has been found that the inner telescoping portion may be moved approximately 18 additional inches from its collapsed position. This may be useful in changing tires or the like on a trailer.

FIG. 3 relates to another embodiment of the present invention in which the rough adjusting column 60 is generally the same as that shown in the embodiment of FIG. 1, but the engaging member 250 has been changed so as to be suitable for mounting on the tongue or front towing portion of a typical travel trailer. This engaging member 250 also comprises a square tubular portion 260 which is slidably mounted on the rough adjusting column 60 and also includes a mounting plate 270 which is welded to the tubular portion 260 and is attached to the dividing plate or hitch plate on a typical trailer tongue by the use of bolts or the like. FIG. 5 shows three holes 280 which are used to fasten the mounting plate 270 to the trailer tongue and also shows an aperture 290 through which the upright vertical housing 20 of the conventional lifting jack passes in this particular embodiment. A similar locating pin 300 is provided which has a flat portion 310 on a collar or disk 320 which allows locking behind tab 330 once the engaging member 260 is positioned on the rough adjusting holes 170 of the rough adjusting column 60.

All of the components of the present invention may be fabricated from steel with the various members connected thereto welded on for durability and strength. It has been found that the use of Allen head or set screw-type heads on the various fasteners throughout the present invention makes the device less susceptible to theft and tampering. For a similar reason, the screw fasteners may be recessed in either counter-sunk or built-up recesses for the screw heads. The rough adjusting column may be fabricated from square steel tubing about 1½ inches on each side. A 19 inch length having holes equally spaced about one inch apart therein has proven satisfactory. The rounded clamps extending around the jack housing may be fabricated of 1 inch steel strip stock, bent, and then welded to the rough adjusting column by means of upper and lower steel connecting strips fitting over the top and bottom of the square tubing, respectively, which as noted earlier, should be provided with drainage holes. The engaging member would of course have to be of a slightly larger cross-section than the column so as to be slidable on the column, but also could be made of square steel tubing. A six inch length has been found to be adequate to support the two arm-like projections which are spaced about 4 inches apart to fit a standard 4 inch by 4 inch rear trailer bumper. The mounting plate for use on the front end of a trailer may be made of steel stock and be welded to the tubular portion of the engaging member. The use of ½ inch diameter pin steel for the locating pin to fit appropriately sized holes in the column and engaging member has also been found satisfactory.

The improved jacking device of the present invention does not have to be removed when the trailer is moved from place to place as was the case with the prior art trailer jack described earlier in this specification. The jacking device of the present invention is self-storing in that it simply has to be lifted up and out of the way by moving the engaging member to one of the lower adjusting holes on the rough adjusting column. This raises the entire device up and off the ground insuring adequate travel clearance. As referred to above, once the support base of the jacking device of the present invention makes contact with the ground any additional movement of the jack in an upward direction could be used to lift the trailer to fix a wheel or gain additional access space to the bottom of the trailer. Further height could also be gained by setting the engaging member at the highest possible location on the rough adjusting column. The jacking device of the present invention may be attached to either the rear bumper of a trailer or the front tongue of a trailer unlike most prior art devices. Although some prior art devices were positionable on the trailer tongue, none were usable on the bumper portion of the trailer due to thin construction of the trailer bumper. The jacking device of the present invention puts very little if any stress on the walls of the trailer bumper.

The rough adjusting column which attaches to the upright vertical housing of the present invention can be rotated from side to side or completely around in some instances so as to allow unlimited adjustment. Since the rough adjusting column is positioned below the top of the upright vertical housing either a top or side winding conventional jacking device may be used. One additional advantage of the present invention is that no cumbersome buildup blocks need be carried around by the trailer owner in order to roughly position the support base relative to the ground. The rough adjusting column of the present invention accomplishes this rough adjustment without the need for the heavy and bulky buildup blocks normally carried by many trailer owners.

While the above description constitutes the preferred embodiment of the present invention, it will be appreciated that the invention is susceptible to modification, variation, and change without departing from the proper scope or fair meaning of the accompanying claims.

What is claimed is:

1. In a jacking device having an upright vertical housing and including means for moving a support base and inner telescoping member in said vertical housing from a retracted position to an extended position so that the overall length of said jacking device is increased, the improvement comprising:

a rough adjusting column spaced apart from and secured to the exterior of said upright vertical housing, said column including an engaging member movably mounted thereon for contacting the object to be lifted, and also including means for locating and securing said engaging member at various positions along said column, said engaging member comprising a tubular barrel slidably mounted on said column and a pair of generally horizontal separated arm-like projections extending in spaced apart horizontal planes in a direction generally normal to said barrel having means to overlap the upper and lower surfaces of the object being lifted, said arm-like projections being connected at their outermost ends by a securing means.

2. The invention of claim 1 wherein said securing means comprises a nut and bolt.

3. In a jacking device having an upright vertical housing and including means for moving a support base and inner telescoping member in said vertical housing from a retracted position to an extended position so that the overall length of said jacking device is increased, the improvement comprising:

a rough adjusting column spaced apart from and secured to the exterior of said upright vertical housing, said column including an engaging member movably mounted thereon for contacting the object to be lifted, and also including means for locating and securing said engaging member at various positions along said column, said engaging member comprising a tubular barrel slidably mounted on said column and a plate extending in a direction generally normal to the object being lifted adapted to be secured to the object being lifted by fastening means, and wherein said plate contains an aperture through which the upright vertical housing of said jacking device may be moved.

4. The invention of claim 1 wherein said fastening means comprises a plurality of threaded screws.

5. In a jacking device having an upright vertical housing and including means for moving a support base and inner telescoping member in said vertical housing from a retracted position to an extended position so that the overall length of said jacking device is increased, the improvement comprising:

a rough adjusting column spaced apart from and secured to the exterior of said upright vertical housing, said column including an engaging member slidably mounted thereon for contacting the object to be lifted, and also including means for locating and securing said engaging member at various positions along said column, said engaging member comprising a tubular barrel slidably mounted on said column and contiguous therewith and at least one generally horizontal projection extending in a direction generally normal to said barrel having means to contact the object being lifted, and said means for locating and securing said engaging member comprising a locating pin, a plurality of longitudinally spaced holes extending transversely through said rough adjusting column, and a complementary pair of holes extending transversely through the portion of said engaging member which is slidably mounted on said column, so that the locating pin may be inserted through the pair of holes in the engaging member and two of the holes extending through said column, all of which holes have been transversely aligned.

6. The invention of claim 5 wherein said locating pin is bent 90° and further comprises a disk-shaped collar adjacent its one end located prior to said 90° bend, said collar including a flat portion adapted for clearing a locking tab on said engaging member when said pin is rotated and removed from said engaging member.

* * * * *